(12) United States Patent
Lee et al.

(10) Patent No.: US 8,133,946 B2
(45) Date of Patent: Mar. 13, 2012

(54) NON-HALOGEN FLAMEPROOF POLYCARBONATE RESIN COMPOSITION

(75) Inventors: Min Soo Lee, Uiwang-si (KR); Im Hyuck Bae, Uiwang-si (KR); Beom Jun Joo, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 12/963,966

(22) Filed: Dec. 9, 2010

(65) Prior Publication Data

US 2011/0152415 A1     Jun. 23, 2011

(30) Foreign Application Priority Data

Dec. 21, 2009  (KR) .................. 10-2009-0128390

(51) Int. Cl.
*C08K 5/527* (2006.01)
(52) U.S. Cl. ...................................................... 524/120
(58) Field of Classification Search ................ 524/120
See application file for complete search history.

(56) References Cited

U.S. PATENT DOCUMENTS

| | | | |
|---|---|---|---|
| 4,178,281 A | 12/1979 | Horn, Jr. | |
| 4,692,488 A | 9/1987 | Kress et al. | |
| 5,061,745 A | 10/1991 | Wittmann et al. | |
| 2011/0160367 A1* | 6/2011 | Lee et al. | 524/120 |

FOREIGN PATENT DOCUMENTS

EP        0728811 A2    8/1996

OTHER PUBLICATIONS

Office Action in commonly owned U.S. Appl. No. 12/968,894 mailed Nov. 10, 2011, pp. 1-6.

* cited by examiner

*Primary Examiner* — Peter Szekely
(74) *Attorney, Agent, or Firm* — Summa, Additon & Ashe, P.A.

(57) ABSTRACT

A non-halogen flameproof polycarbonate resin composition of the present invention comprises (A) about 30 to about 100% by weight of a polycarbonate resin, (B) about 0 to about 70% by weight of a rubber modified aromatic vinyl resin, and (C) about 0.5 to about 30 parts by weight of a phosphorus compound represented by the following Chemical Formula (I) or a combination thereof, based on about 100 parts by weight of the base resin including (A) and (B). The present invention can provide a polycarbonate resin composition which can have excellent flame retardancy and which can be environmentally friendly.

[Chemical Formula (I)]

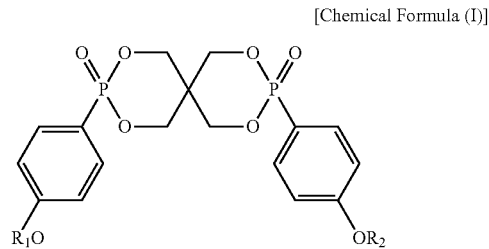

wherein $R_1$ and $R_2$ are each independently $C_1$ to $C_{10}$ alkyl, $C_5$ to $C_7$ cycloalkyl or phenyl.

12 Claims, No Drawings

NON-HALOGEN FLAMEPROOF POLYCARBONATE RESIN COMPOSITION

CROSS-REFERENCE TO RELATED APPLICATION

This application claims priority from Korean Patent Application No. 2009-0128390, filed in the Korean Intellectual Property Office on Dec. 21, 2009, the entire disclosure of which is incorporated herein by reference.

FIELD OF THE INVENTION

The present invention relates to a non-halogen flameproof polycarbonate resin composition.

BACKGROUND OF THE INVENTION

Generally, polycarbonate/styrene containing copolymer blends can have high notch impact strength and good processability. Therefore, polycarbonate/styrene containing copolymer blends have been widely used in large injection molded products, such as computer housings or other office equipment, which emit a lot of heat. Accordingly, flame retardancy, heat resistance and high mechanical strength are important factors that should be considered when manufacturing the blend.

Halogen-containing flame retardants and antimony compounds are conventionally used to impart flame retardancy to resin compositions. However, halogen-containing flame retardants can produce toxic gases during combustion. Therefore, there is an increasing demand for non-halogen-containing flame retardants.

Currently the most common method for imparting flame retardancy without halogen-containing flame retardants uses a phosphorus compound. A representative phosphorus compound used as a flame retardant is a phosphate ester flame retardant, which is commercially available for purchase. U.S. Pat. No. 4,692,488 discloses a thermoplastic resin composition containing a non-halogen aromatic polycarbonate resin, a non-halogen styrene-acrylonitrile copolymer, a non-halogen phosphorous compound, a tetrafluoroethylene polymer, and a small amount of ABS copolymer. U.S. Pat. No. 5,061,745 discloses a flameproof resin composition containing an aromatic polycarbonate resin, an ABS graft copolymer, a copolymer and a monomeric phosphate ester. However, the resin compositions described above can require the addition of an excessive amount of phosphate ester flame retardant in order to obtain a certain level of flame retardancy. Furthermore, the flame retardant can migrate to a molding surface during a molding operation, which can result in surface cracking, i.e. the so-called "juicing" phenomenon, and further heat resistance of the resin composition can be deteriorated.

Other phosphorus compound flame retardants include phosphazene compounds. EP Patent No. 728,811 discloses a flameproof resin composition containing an aromatic polycarbonate resin, a graft copolymer, a vinyl copolymer and a phosphazene compound. EP '811 shows that no dripping occurs during combustion when using the phosphazene compound as a flame retardant even though an additional anti-dripping agent is not employed, and that the flameproof resin composition disclosed therein can have excellent heat resistance and impact strength. However, in EP '811, when using the phosphazene compound as a flame retardant, an increased amount of flame retardant should be used to maintain a certain degree of flame retardancy.

SUMMARY OF THE INVENTION

To solve the above mentioned problems of conventional flameproof thermoplastic resins, the inventors of the present invention have invented a flameproof polycarbonate resin composition including a blend of polycarbonate resin and aromatic vinyl resin and a phosphorus compound represented by the following Chemical Formula (I) as a flame retardant. The polycarbonate resin composition of the invention can have excellent flame retardancy. The polycarbonate resin composition of the invention further can be environmentally friendly because hydrogen halide gases are not generated during preparation of the composition or a product including the same during combustion.

The present invention provides a flameproof polycarbonate resin composition comprising a base resin including (A) about 30 to about 100% by weight of a polycarbonate resin and (B) about 0 to about 70% by weight of a rubber modified aromatic vinyl resin, and (C) about 0.5 to about 30 parts by weight of a phosphorus compound represented by the following Chemical Formula (I) or a combination thereof, based on about 100 parts by weight of the base resin including (A) and (B).

[Chemical Formula (I)]

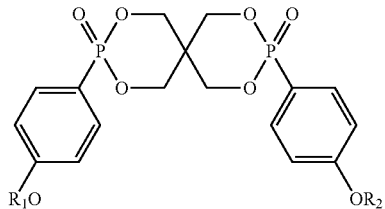

wherein $R_1$ and $R_2$ are each independently $C_1$ to $C_{10}$ alkyl, $C_5$ to $C_7$ cycloalkyl or phenyl.

In an exemplary embodiment of the invention, (B) the rubber modified aromatic vinyl resin comprises ($B_1$) about 20 to about 100% by weight of a graft copolymer resin prepared by graft polymerization of about 5 to about 65 parts by weight of a rubber polymer, about 30 to about 95 parts by weight of an aromatic vinyl monomer, about 1 to about 20 parts by weight of a monomer copolymerizable with the aromatic vinyl monomer, and about 0 to about 15 parts by weight of a monomer imparting processability and heat resistance; and ($B_2$) about 0 to about 80% by weight of a copolymer resin prepared by polymerization of about 60 to about 90 parts by weight of a aromatic vinyl monomer, about 10 to about 40 parts by weight of a monomer copolymerizable with the aromatic vinyl monomer, and about 0 to about 30 parts by weight of a monomer imparting processability and heat resistance.

In another exemplary embodiment of the invention, the present invention provides plastic molded articles prepared using the resin composition.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

(A) Polycarbonate Resin

The polycarbonate resin according to exemplary embodiments of the present invention may be prepared by a person with ordinary skill in the art through a conventional method, and can be any commercially available polycarbonate resin without limitation.

For example, the polycarbonate resin may be prepared by reacting a diphenol compound represented by the following Chemical Formula (II) with a phosgene, a halogen formate or a carboxylic acid diester:

[Chemical Formula (II)]

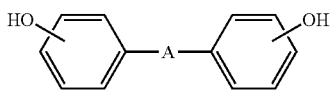

wherein A is a single bond, $C_1$ to $C_5$ alkylene group, $C_1$ to $C_5$ alkylidene group, $C_5$ to $C_6$ cycloalkylidene group, —S— or —$SO_2$—.

Examples of the diphenol compound represented by the Chemical Formula (II) may include without limitation hydroquinone, resorcinol, 4,4'-dihydroxydiphenol, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane, and the like, and combinations thereof.

In exemplary embodiments of the invention, the diphenol can include 2,2-bis-(4-hydroxyphenyl)-propane (also referred to as "bisphenol-A"), 2,2-bis-(3,5-dichloro-4-hydroxyphenyl)-propane, 1,1-bis-(4-hydroxyphenyl)-cyclohexane, or a combination thereof.

In exemplary embodiments of the invention, the polycarbonate resin can have a weight average molecular weight ($M_w$) of about 10,000 to about 200,000 g/mol, for example about 15,000 to about 80,000 g/mol.

Examples of the polycarbonate resin can include without limitation linear polycarbonate resin, branched polycarbonate resin, polyester-carbonate resin, and the like, and combinations thereof. The branched polycarbonate resin may be prepared by using about 0.05 to about 2 mol %, based on total quantity of diphenols used, of tri- or higher functional compounds, for example, those with three or more phenolic groups.

The polycarbonate resin used in the manufacture of the resin composition of the present invention can include without limitation a polycarbonate homopolymer, polycarbonate copolymer, or a combination thereof.

Some portion of the polycarbonate resin used in the manufacture of the resin composition of the present invention may be replaced with an aromatic polyester-carbonate resin that can be obtained by polymerization in the presence of an ester precursor, for example, difunctional carboxylic acid.

The polycarbonate resin composition of the invention includes (A) the polycarbonate resin in an amount of about 30 to about 100% by weight, based on 100% by weight of a base resin including (A) and (B). In some embodiments, the base resin may include the polycarbonate resin (A) in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99 or 100% by weight. Further, according to some embodiments of the present invention, the amount of the polycarbonate resin (A) can be in a range from about any of the foregoing amounts to about any other of the foregoing amounts. In the present invention, if the amount of the polycarbonate resin is less than about 30% by weight, the flame retardancy of the present invention may be deteriorated.

(B) Rubber Modified Aromatic Vinyl Resin

In exemplary embodiments of the present invention, the rubber modified aromatic vinyl resin may be a polymer comprising a matrix (continuous phase) of aromatic vinyl polymer and rubber polymer dispersed therein.

In exemplary embodiments of the present invention, the rubber modified aromatic vinyl resin may be prepared by polymerizing an aromatic vinyl monomer and a vinyl group-containing monomer copolymerizable with the aromatic vinyl monomer in the presence of a rubber polymer. These rubber modified aromatic vinyl resins can be prepared by known methods such as emulsion polymerization, suspension polymerization or bulk polymerization.

In exemplary embodiments, the rubber modified aromatic vinyl resin is produced by preparing separately a graft copolymer resin having a high rubber content and a copolymer resin which does not contain rubber, and mixing and extruding them together. However, in a bulk polymerization, the rubber modified aromatic vinyl resin can be prepared by first reaction process without separately preparing the graft copolymer resin and the copolymer resin.

In either case, the amount of rubber contained in a final rubber modified aromatic vinyl resin may be about 5 to about 30 parts by weight based on 100 parts by weight of the base resin. In some embodiments, the rubber modified aromatic vinyl resin may include the rubber in an amount of about 5, 6, 7, 8, 9, 10, 11, 12, 13, 14, 15, 16, 17, 18, 19, 20, 21, 22, 23, 24, 25, 26, 27, 28, 29, or 30 parts by weight. Further, according to some embodiments of the present invention, the amount of the rubber can be in a range from about any of the foregoing amounts to about any other of the foregoing amounts.

Examples of the rubber modified aromatic vinyl resin may include without limitation acrylonitrile-butadiene-styrene (ABS) copolymer resin, acrylonitrile-acryl rubber-styrene (AAS) copolymer resin, acrylonitrile-ethylene propylene rubber-styrene copolymer resin, and the like, and combinations thereof.

In the rubber modified aromatic vinyl resin, the graft copolymer resin can be used alone or in combination with the copolymer resin taking into account the compatibility thereof. In exemplary embodiments, the rubber modified aromatic vinyl resin comprises ($B_1$) about 20 to about 100% by weight of the graft copolymer resin and ($B_2$) about 0 to about 80% by weight of the copolymer resin.

In some embodiments, the rubber modified aromatic vinyl resin (B) may include the graft copolymer resin ($B_1$) in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87 88, 89, 90, 91, 92, 93, 94, 95, 96, 97, 98, 99, or 100% by weight. Further, according to some embodiments of the present invention, the amount of the graft copolymer resin ($B_1$) can be in a range from about any of the foregoing amounts to about any other of the foregoing amounts.

In some embodiments, the rubber modified aromatic vinyl resin (B) may not include the copolymer resin ($B_2$) (i.e., the rubber modified aromatic vinyl resin (B) may include 0% by weight of the copolymer resin ($B_2$)). In some embodiments, the copolymer resin ($B_2$) may be present in the rubber modified aromatic vinyl resin (B), i.e., the rubber modified aromatic vinyl resin (B) may include the copolymer resin ($B_2$) in an amount of greater than and/or about 0, 1, 2, 3, 4, 5, 6, 7, 8, 9, 10, 11, 12, 13, 14, 15, 16, 17, 18, 29, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80% by weight. Further, according to some embodiments of the present invention, the amount of the copolymer resin ($B_2$) can be in a range from about any of the foregoing amounts to about any other of the foregoing amounts.

The amount of (B) the rubber modified aromatic vinyl resin used in the manufacture of the flameproof polycarbonate resin composition of the present invention may be about 0 to about 70% by weight based on 100% by weight of the base resin including (A) and (B). In some embodiments, the flameproof polycarbonate resin composition may not include the rubber modified aromatic vinyl resin (B) (i.e., the flameproof polycarbonate resin composition may include 0% by weight of the rubber modified aromatic vinyl resin (B)). In some embodiments, the rubber modified aromatic vinyl resin (B) may be present in the flameproof polycarbonate resin composition, i.e., the flameproof polycarbonate resin composition may include the rubber modified aromatic vinyl resin (B) in an amount of greater than and/or about 0, 1, 2, 3, 4, 5, 6, 7, 8, 9, 10, 11, 12, 13, 14, 15, 16, 17, 18, 29, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70% by weight. Further, according to some embodiments of the present invention, the amount of the rubber modified aromatic vinyl resin (B) can be in a range from about any of the foregoing amounts to about any other of the foregoing amounts.

($B_1$) The graft copolymer resin and ($B_2$) the copolymer resin, which are components of (B) the rubber modified aromatic vinyl resin, are described in detail in the following.

($B_1$) Graft Copolymer Resin

In exemplary embodiments of the present invention, ($B_1$) the graft copolymer resin may be prepared by adding a graft-copolymerizable aromatic vinyl monomer and a monomer copolymerizable with the aromatic vinyl monomer to a rubber polymer and polymerizing them together.

Examples of the rubber polymer for preparing the graft copolymer resin may include without limitation diene-rubbers such as polybutadiene, poly(styrene-butadiene), poly(acrylonitrile-butadiene) and the like; saturated rubbers in which hydrogen is added to the diene rubbers; isoprene rubbers; chloroprene rubbers; acrylic rubbers such as polyacrylic acid butyl; ethylene-propylene rubbers; ethylene-propylene-diene terpolymers (EPDM); and the like. The rubber polymer may be used alone or in combination with one another. In exemplary embodiments, a diene rubber, such as a butadiene rubber, can be used.

In the present invention, the rubber polymer may be used in an amount of about 5 to about 65 parts by weight, based on the total weight of ($B_1$) the graft copolymer resin. In some embodiments, the rubber polymer may be used in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, or 65 parts by weight. Further, according to some embodiments of the present invention, the amount of the rubber polymer can be in a range from about any of the foregoing amounts to about any other of the foregoing amounts.

In exemplary embodiments, the rubber polymer can have a particle size of about 0.1 to about 4.0 µm, taking into account impact strength and appearance. In some embodiments, the rubber polymer can have a particle size of about 0.1, 0.2, 0.3, 0.4, 0.5, 0.6, 0.7, 0.8, 0.9, 1, 2, 3, or 4 µm. Further, according to some embodiments of the present invention, the rubber polymer can have a particle size in a range from about any of the foregoing amounts to about any other of the foregoing amounts.

Examples of the aromatic vinyl monomers may include without limitation styrenic monomers, such as styrene, α-methyl styrene, p-methyl styrene, and the like. The styrenic monomer can be used alone or in combination with one another.

The aromatic vinyl monomer may be used in an amount of about 30 to about 95 parts by weight, based on the total weight of ($B_1$) the graft copolymer resin. In some embodiments, the aromatic vinyl monomer may be used in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87 88, 89, 90, 91, 92, 93, 94, or 95 parts by weight. Further, according to some embodiments of the present invention, the amount of the aromatic vinyl monomer can be in a range from about any of the foregoing amounts to about any other of the foregoing amounts.

In exemplary embodiments, at least one monomer copolymerizable with the aromatic vinyl monomer may also be employed. The monomer which may be copolymerized with the aromatic vinyl monomer may include without limitation unsaturated nitrile-containing compounds such as acrylonitrile, methacrylonitrile, and the like. The unsaturated nitrile-containing compound may be used alone or in combination with one another.

The monomer copolymerizable with the aromatic vinyl monomer may be used in an amount of about 1 to about 20 parts by weight based on the total weight of ($B_1$) the graft copolymer resin. In some embodiments, the monomer copolymerizable with the aromatic vinyl monomer may be used in an amount of about 1, 2, 3, 4, 5, 6, 7, 8, 9, 10, 11, 12, 13, 14, 15, 16, 17, 18, 19, or 20 parts by weight. Further, according to some embodiments of the present invention, the amount of the monomer copolymerizable with the aromatic vinyl monomer can be in a range from about any of the foregoing amounts to about any other of the foregoing amounts.

In some embodiments, the graft copolymer resin may also include other monomers such as but not limited to acrylic acid, methacrylic acid, maleic anhydride, N-substituted maleimide, and the like, in order to impart good processability and heat resistance. The monomers can be used alone or in combination with one another. The other monomers can be added in an amount of about 0 to about 15 parts by weight based on the total weight of ($B_1$) the graft copolymer resin. In some embodiments, the graft copolymer resin may not include the other monomer (i.e., the graft copolymer resin may include 0 parts by weight of the other monomer). In some embodiments, the other monomer may be present in the graft copolymer resin, i.e., the graft copolymer resin may include the other monomer in an amount of greater than and/or about 0, 1, 2, 3, 4, 5, 6, 7, 8, 9, 10, 11, 12, 13, 14, or 15 parts by weight. Further, according to some embodiments of the present invention, the amount of the other monomer can be in a range from about any of the foregoing amounts to about any other of the foregoing amounts.

(B₂) Copolymer Resin

The copolymer resin of the present invention may be prepared by copolymerizing an aromatic vinyl monomer and a monomer copolymerizable with the aromatic vinyl monomer, and the ratio between the monomers forming (B₂) the copolymer resin may be equal to the ratio between the monomers forming (B₁) the graft copolymer resin, except for the rubber polymer, in order to improve the compatibility between (B₁) the graft copolymer resin and (B₂) the copolymer resin.

Examples of the aromatic vinyl monomer may include without limitation styrene, α-methyl styrene, p-methyl styrene, and the like. These monomers can be used alone or in combination with one another. In exemplary embodiments, the aromatic vinyl monomer is used in an amount of about 60 to about 90 parts by weight based on the total weight of (B₂) the copolymer resin. In some embodiments, the aromatic vinyl monomer may be used in an amount of about 60, 61, 62, 63, 64, 65, 66, 67, 68, 69, 70, 71, 72, 73, 74, 75, 76, 77, 78, 79, 80, 81, 82, 83, 84, 85, 86, 87 88, 89, or 90 parts by weight. Further, according to some embodiments of the present invention, the amount of the aromatic vinyl monomer can be in a range from about any of the foregoing amounts to about any other of the foregoing amounts.

Examples of the monomer copolymerizable with the aromatic vinyl monomer can include without limitation unsaturated nitrile-containing compounds such as acrylonitrile, methylmethacrylonitrile, and the like. The unsaturated nitrile-containing compounds may be used alone or in combination with one another. The monomer copolymerizable with the aromatic vinyl monomer may be used in an amount of about 10 to about 40 parts by weight based on the total weight of (B₂) the copolymer resin. In some embodiments, the monomer copolymerizable with the aromatic vinyl monomer may be used in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 parts by weight. Further, according to some embodiments of the present invention, the amount of the monomer copolymerizable with the aromatic vinyl monomer can be in a range from about any of the foregoing amounts to about any other of the foregoing amounts.

In some embodiments, the copolymer resin may also include other monomers such as but not limited to acrylic acid, methacrylic acid, maleic anhydride, N-substituted maleimide, and the like, and combination thereof, in order to impart good processability and heat resistance. The amount of the monomers may be about 0 to about 30 parts by weight based on the total weight of (B₂) the copolymer resin. In some embodiments, the copolymer resin may not include the other monomer (i.e., the copolymer resin may include 0 parts by weight of the other monomer). In some embodiments, the other monomer may be present in the copolymer resin, i.e., the copolymer resin may include the other monomer in an amount of greater than and/or about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 parts by weight. Further, according to some embodiments of the present invention, the amount of the other monomer can be in a range from about any of the foregoing amounts to about any other of the foregoing amounts.

(C) Phosphorus Compound

The phosphorus compound used in the resin composition of the present invention is represented by the following Chemical Formula (I):

[Chemical Formula 1]

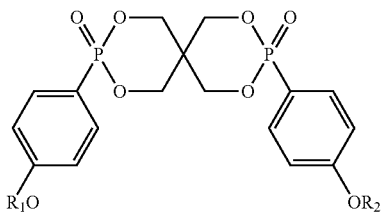

wherein $R_1$ and $R_2$ are each independently $C_1$ to $C_{10}$ alkyl, $C_5$ to $C_7$ cycloalkyl or phenyl.

In an exemplary embodiment of the invention, $R_1$ and $R_2$ may be each independently $C_1$ to $C_{10}$ alkyl or $C_5$ to $C_7$ cycloalkyl.

Combinations of compounds of Chemical Formula (I) may also be used.

In exemplary embodiments, the phosphorus compound represented by the Chemical Formula (I) may be prepared by the known methods. For example, a pentaerythritol bis anisole phosphonate is prepared by reacting pentaerythritol and anisole phosphonic dichloride in a solution comprising magnesium chloride and toluene.

In exemplary embodiments, the phosphorus compound represented by the Chemical Formula (I) may be used in an amount of about 0.5 to about 30 parts by weight, for example, an amount of about 3 to about 20 parts by weight, based on about 100 parts by weight of the base resin.

In some embodiments, the phosphorus compound represented by the Chemical Formula (I) may be used in an amount of about 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 parts by weight. Further, according to some embodiments of the present invention, the amount of the phosphorus compound represented by the Chemical Formula (I) can be in a range from about any of the foregoing amounts to about any other of the foregoing amounts.

In exemplary embodiments, if the phosphorus compound represented by the Chemical Formula (I) or a combination thereof is used in an amount of less than about 0.5 parts by weight, flame retardancy may be deteriorated, and if it is used in an amount of more than about 30 parts by weight, unique properties of the polycarbonate resin may be deteriorated.

The flameproof polycarbonate resin composition according to the present invention may further include one or more other additives depending on its use. Examples of such additives may include without limitation plasticizers, heat stabilizers, antioxidants, anti-dripping agents, compatibilizers, light-stabilizers, pigments, dyes, and/or inorganic fillers and the like. The additives can be used alone or in combination with one another. Examples of the inorganic fillers include asbestos, glass fibers, talc, ceramic, sulfates, and the like, and combinations thereof.

The additives can be added in an amount of about 30 parts by weight or less, for example about 0.001 to about 30 parts by weight, based on about 100 parts by weight of the base resin including (A), (B), and (C). In some embodiments, the additive(s) may be used in an amount of about 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 24, 25, 26, 27, 28, 29, or 30 parts by weight. Further, according to some embodiments of the present invention, the amount of the additive(s) can be in a range from about any of the foregoing amounts to about any other of the foregoing amounts.

The resin composition of the present invention can be prepared by conventional methods. For example, all the components and additives can be mixed together and extruded through an extruder and can be prepared in the form of pellets. The pellets can be molded by conventional methods to form housings of electric/electronic goods such as televisions, computers, audio systems, air conditioners, office automation equipment, and the like which require good flame retardancy.

A method of preparing a molded article from the flameproof thermoplastic resin composition of the present invention may include without limitation extrusion molding, injection molding, vacuum molding, casting molding and the like, and which can be easily carried out by a person of ordinary skill in the art.

The invention may be better understood by reference to the following examples, and which are intended for the purpose of illustration and are not to be construed as in any way limiting the scope of the present invention, which is defined in the claims appended hereto.

EXAMPLES

Each component specifications of the flameproof polycarbonate resin compositions used in Examples and Comparative Examples are as follows:

(A) Polycarbonate Resin

Bisphenol-A type polycarbonate with a weight average molecular weight (Mw) of about 25,000 g/mol is used as the polycarbonate resin.

(B) Rubber Modified Aromatic Vinyl Resin ($B_1$) Graft Copolymer Resin 50 parts by weight of butadiene rubber latex, 36 parts by weight of styrene as a grafting monomer, 14 parts by weight of acrylonitrile, and 150 parts by weight of deionized water are mixed. 1.0 part by weight of potassium oleate, 0.4 parts by weight of cumen hydroperoxide, 0.2 parts by weight of mercaptan-containing chain transfer agent, 0.4 parts by weight of glucose, 0.01 parts by weight of ferrous sulfate hydrate, and 0.3 parts by weight of sodium pyrophosphate are added into the mixture. The blend is kept at 75° C. for 5 hours to obtain graft copolymer (g-ABS) latex. 0.4 parts of sulfuric acid is added into the graft copolymer (g-ABS) latex and the latex is coagulated to obtain the graft copolymer resin (g-ABS) in a powder form.

($B_2$) Copolymer Resin 75 parts by weight of styrene, 25 parts by weight of acrylonitrile, and 120 parts by weight of deionized water are mixed. 0.2 parts by weight of azobisisobutylonitrile (AIBN), 0.4 parts by weight of tricalciumphosphate and 0.2 parts by weight of mercaptan-containing chain transfer agent are added into the mixture. The resultant solution is heated from room temperature to 80° C. for 90 minutes and then kept for 180 minutes at this temperature to obtain a styrene-acrylonitrile copolymer resin (SAN). The styrene-acrylonitrile copolymer resin (SAN) is washed, dehydrated and dried to obtain a styrene-acrylonitrile copolymer resin (SAN) in a powder form. The prepared styrene-acrylonitrile copolymer resin (SAN) has a weight average molecular weight (Mw) of about 90,000 g/mol.

(C) Pentaerythritol Bis Anisole Phosphonate Compound 136 g of pentaerythritol and 1 g of magnesium chloride are added into 1 L of toluene, and then 450 g of anisole phosphonic dichloride is added into them. The resultant solution is stirred for 7 hours at 130° C. After the completion of the reaction, the temperature of the product is reduced to room temperature. The product is filtrated, and the resultant sediment is added into 1 L of water and washed in three times. After the completion of the washing operation, the resultant product is filtrated and dried to obtain a pentaerythritol bis anisole phosphonate.

Examples 1-2

The above-mentioned components are added to a conventional mixer according to the amounts set forth in the following Table 1, and the mixture is extruded through a conventional twin screw extruder at a temperature range of about 200 to about 280° C. to prepare pellets. The prepared pellets are dried at 80° C. for 2 hours and molded into test specimens for flame retardancy in an injection molding machine at about 180 to about 280° C. with a mold temperature of about 40 to about 80° C. Flame retardancy is measured in accordance with UL 94 VB under a thickness of 1/8".

Comparative Examples 1-4

As stated in the following Table 1, Comparative Examples 1-4 are prepared in the same manner as in Examples 1-2 except that instead of pentaerythritol bis anisole phosphonate, resorcinol bis(di-2,6-xylyl phosphate) and pentaerythritol bis phenyl phosphonate are employed as the phosphorus compound. The results are shown in Table 1.

TABLE 1

| | Examples | | Comparative examples | | | |
|---|---|---|---|---|---|---|
| | 1 | 2 | 1 | 2 | 3 | 4 |
| Polycarbonate | 100 | 60 | 100 | 60 | 100 | 60 |
| ABS resin | — | 40 | — | 40 | — | 40 |
| Resorcinol bis (di-2,6-xylyl phosphate) | — | — | 3 | 18 | — | — |
| Pentaerythritol bis phenyl phosphonate | — | — | — | — | 3 | 18 |
| Pentaerythritol bis anisole phosphonate | 3 | 18 | — | — | — | — |
| First average flame out time (sec) | 0 | 4 | 1 | 22 | 1 | 5 |
| Second average flame out time (sec) | 3 | 6 | 9 | 25 | 4 | 9 |
| UL94 flame retardancy (1/8") | V-0 | V-0 | V-1 | Fail | V-1 | V-1 |

As shown above, Examples 1 to 2 prepared by employing the pentaerythritol bis anisole phosphonate represented by the Chemical Formula (I) show a short average flame out time and good flame retardancy, compared to Comparative Examples 1 to 4 prepared by employing the resorcinol bis(di-2,6-xylyl phosphate) and pentaerythritol bis phenyl phosphonate, respectively.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A non-halogen flameproof polycarbonate resin composition comprising:
   (A) about 30 to about 100% by weight of a polycarbonate resin;
   (B) about 0 to about 70% by weight of a rubber modified aromatic vinyl resin; and
   (C) about 0.5 to about 30 parts by weight of a phosphorus compound represented by the following Chemical Formula (I) or a combination thereof, based on about 100 parts by weight of the base resin including (A) and (B):

[Chemical Formula (I)]

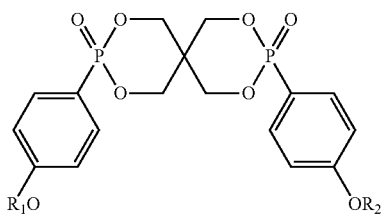

wherein $R_1$ and $R_2$ are each independently $C_1$ to $C_{10}$ alkyl, $C_5$ to $C_7$ cycloalkyl or phenyl.

2. The non-halogen flameproof polycarbonate resin composition of claim 1, wherein (B) the rubber modified aromatic vinyl resin is a polymer comprising a matrix of aromatic vinyl polymer and rubber polymer dispersed therein.

3. The non-halogen flameproof polycarbonate resin composition of claim 1, wherein (B) the rubber modified aromatic vinyl resin comprises ($B_1$) about 20 to about 100% by weight of a graft copolymer resin prepared by graft polymerization of about 5 to about 65 parts by weight of a rubber polymer, about 30 to about 95 parts by weight of an aromatic vinyl monomer, about 1 to about 20 parts by weight of a monomer copolymerizable with said aromatic vinyl monomer, and about 0 to about 15 parts by weight of a monomer imparting processability and heat resistance; and ($B_2$) about 0 to about 80% by weight of a copolymer resin prepared by polymerization of about 60 to about 90 parts by weight of a aromatic vinyl monomer, about 10 to about 40 parts by weight of a monomer copolymerizable with said aromatic vinyl monomer, and about 0 to about 30 parts by weight of a monomer imparting processability and heat resistance.

4. The non-halogen flameproof polycarbonate resin composition of claim 3, wherein the aromatic vinyl monomer comprises styrene, α-methyl styrene, p-methyl styrene, or a combination thereof.

5. The non-halogen flameproof polycarbonate resin composition of claim 3, wherein the monomer copolymerizable with said aromatic vinyl monomer is an unsaturated nitrile-containing compound.

6. The non-halogen flameproof polycarbonate resin composition of claim 3, wherein the monomer imparting processablility and heat comprises acrylic acid, methacrylic acid, maleic anhydride, N-substituted maleimide or a combination thereof.

7. The non-halogen flameproof polycarbonate resin composition of claim 1, further comprising about 30 parts by weight or less of one or more additives comprising a heat stabilizer, anti-dripping agent, antioxidant, compatibilizer, light-stabilizer, pigment, dye, inorganic filler or a combination thereof.

8. The non-halogen flameproof polycarbonate resin composition of claim 1, wherein said phosphorus compound comprises a compound represented by the following Chemical Formula (I):

[Chemical Formula (I)]

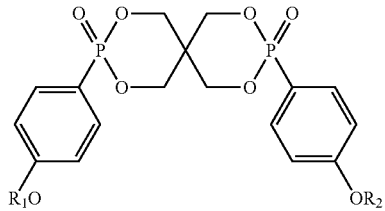

wherein $R_1$ and $R_2$ are independently $C_1$ to $C_{10}$ alkyl or $C_5$ to $C_7$ cycloalkyl.

9. The non-halogen flameproof polycarbonate resin composition of claim 8, wherein $R_1$ and $R_2$ are independently $C_1$ to $C_{10}$ alkyl.

10. The non-halogen flameproof polycarbonate resin composition of claim 1, wherein said phosphorus compound comprises pentaerythritol bis anisole phosphonate.

11. The non-halogen flameproof polycarbonate resin composition of claim 1, comprises about 3 to about 20 parts by weight, based on about 100 parts by weight of the base resin, of said phosphorus compound represented by the Chemical Formula (I).

12. A molded article produced from the non-halogen flameproof polycarbonate resin composition as defined in claim 1.

* * * * *